US012472427B2

(12) United States Patent
Karlsson

(10) Patent No.: US 12,472,427 B2
(45) **Date of Patent: *Nov. 18, 2025**

(54) STATE STREAM GAME ENGINE

(71) Applicant: Electronic Arts Inc., Redwood City, CA (US)

(72) Inventor: Per Henrik Benny Karlsson, North Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,418

(22) Filed: Feb. 12, 2024

(65) Prior Publication Data

US 2024/0261674 A1 Aug. 8, 2024

Related U.S. Application Data

(63) Continuation of application No. 17/645,440, filed on Dec. 21, 2021, now Pat. No. 11,896,898, which is a continuation of application No. 16/369,514, filed on Mar. 29, 2019, now Pat. No. 11,207,594.

(51) Int. Cl.
*A63F 13/355* (2014.01)
*A63F 13/352* (2014.01)

(52) U.S. Cl.
CPC .......... *A63F 13/355* (2014.09); *A63F 13/352* (2014.09); *A63F 2300/538* (2013.01)

(58) Field of Classification Search
CPC .... A63F 13/352; A63F 13/355; A63F 13/358; A63F 2300/538
See application file for complete search history.

(56) References Cited

U.S. PATENT DOCUMENTS

| | | | |
|---|---|---|---|
| 7,458,894 B2 | 12/2008 | Danieli et al. |
| 7,632,186 B2 | 12/2009 | Spanton |
| 8,069,258 B1 | 11/2011 | Howell |
| 8,678,929 B1 | 3/2014 | Nishimura et al. |
| 8,874,661 B2 | 10/2014 | Wild et al. |
| 9,526,995 B2 | 12/2016 | Brunstetter |

(Continued)

FOREIGN PATENT DOCUMENTS

| | | |
|---|---|---|
| CN | 1787422 A | 6/2006 |
| CN | 107741898 | 2/2018 |

OTHER PUBLICATIONS

"Advances in FPS Netcode," by U/Kovaak. Published Jan. 9, 2015. Source: https://www.reddit.com/r/truegaming/comments/2ruqba/advances_in_fps_netcode/ (Year: 2015).

(Continued)

*Primary Examiner* — Steven J Hylinski
(74) *Attorney, Agent, or Firm* — Knobbe, Martens, Olson & Bear, LLP

(57) ABSTRACT

The present disclosure provides a state stream game engine for a video game application. The state stream game engines can decouple the simulation of a video game application from the rendering of the video game application. The simulation of the video game is handled by a simulation engine. The rendering of the video game is handled by a presentation engine. The data generated by the simulation engine can be communicated to the presentation engine 124 using a state stream.

19 Claims, 9 Drawing Sheets

(56) References Cited

U.S. PATENT DOCUMENTS

| | | | |
|---|---|---|---|
| 10,044,800 B2 | 8/2018 | Anastasi | |
| 10,105,598 B2 | 10/2018 | Furumoto et al. | |
| 10,148,978 B2 | 12/2018 | Kopietz | |
| 10,176,278 B2 | 1/2019 | Belmans | |
| 10,549,204 B2 | 2/2020 | Perry | |
| 11,207,594 B2 | 12/2021 | Karlsson | |
| 2003/0038805 A1 | 2/2003 | Wong et al. | |
| 2007/0117617 A1 | 5/2007 | Spanton et al. | |
| 2017/0011554 A1 | 1/2017 | Burba et al. | |
| 2017/0072307 A1 | 3/2017 | Perry | |
| 2017/0104819 A1 | 4/2017 | Anastasi et al. | |
| 2017/0246544 A1 | 8/2017 | Agarwal et al. | |
| 2017/0269685 A1 | 9/2017 | Marks | |
| 2019/0308099 A1* | 10/2019 | Lalonde | A63F 13/352 |

OTHER PUBLICATIONS

"Interpolation—When should I extrapolate and when should I interpolate?" by J Leong, published Mar. 10, 2016. Source: https://gamedev.stackexchange.com/questions/118006/when-should-i-extrapolate-and-when-should-i-interpolate (Year: 2016).

"Rollback Networking in Inversus," by Ryan Juckett. Published Dec. 8, 2016. Source: https://www.gamasutra.com/blogs/RyanJuckett/20161208/287162/Rollback_Networking_in_INVERSUS.php (Year: 2016).

"Snapshot Interpolation," by Glenn Fiedler. Published Nov. 30, 2014. Source: https://gafferongames.com/post/snapshot_interpolation/ (Year: 2014).

"Spectator Games: A New Entertainment Modality for Networked Multiplayer Games," by Steven Drucker, Li-Wei He-, Michael Cohen, Curtis Wong, Anoop Gupta for Microsoft Research. Published Jan. 2003. (Year: 2003).

"Supporting Spectators in Online Multiplayer Games," by Ashwin Bharambe, Venkata Padmanabhan and Srinivasan Seshan. Published Jan. 2004. (Year: 2004).

"Snapshot Interpolation," by Glen Fiedler, published Nov. 30, 2014 in Networked Physics. Source: https://gafferongames.com/post/snapshot_interpolation/ (Year: 2014).

* cited by examiner

STATE STREAM GAME ENGINE

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Video games have increased in popularity and complexity in recent years. Today's video games have many more features and can be much more complex than video games of the past. The video games can have many different processes being performed on the CPU and the GPU. Generally, the CPU can execute the game logic, also referred to as the simulation, and the GPU can render frames, also referred to as the presentation, that are output and displayed to the user. The simulation and rendering have many dependencies, which can be difficult to manage. It can be difficult to synchronize the simulation and rendering processes in order to create smooth and reliable performance within a video game.

SUMMARY OF EMBODIMENTS

The systems, methods, and devices of this disclosure each have several innovative aspects, no single one of which is solely responsible for the all of the desirable attributes disclosed herein.

Some aspects of the present disclosure feature a computer-implemented method for executing a game application on a user computing system: by one or more hardware processor configured with computer executable instructions, executing a game application; executing a plurality of simulation engines within the game application, wherein each simulation engine is configured to execute game logic that is configured to control simulation of a virtual environment within the game application, wherein each simulation engine is configured to control simulation of a different virtual environment, wherein each virtual environment comprises a plurality of virtual objects registered to the corresponding simulation engine; for each simulation engine, generating simulation state data for each virtual object registered to the simulation engine during a simulation cycle; generating graphical state data based at least in part on the simulation state data generated for the simulation cycle; writing the graphical state data for a least a subset of the virtual objects to a state data package during the simulation cycle; after the graphical state data for each virtual object has been written to the state data package, writing the state data package to a state stream during the simulation cycle, wherein the state stream is a portion of volatile memory allocated to receive the state data package; executing a presentation engine within the game application, wherein the presentation engine is configured to generate and render frames for output on a display; selecting, by the presentation engine, at least a first state data package of a plurality of state data packages during a rendering cycle; reading, by the presentation engine, at least the first state data package from the state stream during the rendering cycle; updating, by the presentation engine, a graphical state of first virtual environment corresponding to the virtual environment associated with the first state data package, generating, by the presentation engine, a frame based at least in part on the updated graphical state of the first virtual environment and a second state data package, wherein the second state data package was generated by the same simulation engine that generated the first state data package; and rendering, by the presentation engine, the frame based at least in part on the graphical state data included in the first state data package and the second state data package during the rendering cycle, wherein the presentation engine state data package generates, wherein the presentation engine executes the rendering cycles without further input from the simulation engines after receiving the state data packages.

Various embodiments of the system may include one, all, or any combination of the following features. The simulation cycle and the rendering cycle are the different lengths of time. Interpolating the graphical state data included in the first state data package and the second state data package; generating a plurality of frames based on the interpolation; and rendering the plurality of frames. The simulation cycles for each simulation engine are different lengths of time relative to each other. The each of the plurality of simulation engines execute independent of each other and the presentation engine, wherein the presentation engine generates and renders frames independent of the execution of simulation engine that generated the state data package. Executing one or more simulation engines on different user computing systems and writing state data packages to the state stream on the user computing system over a network. By each simulation engine, writing state data package to a location in non-volatile storage simultaneously with writing the state data package to the state stream. Each simulation engine writes to a different state stream, and each state stream is allocated a different portion of volatile memory to receive the state data package. Determining, by the presentation engine, an state data package is ready for disposal; and deleting the state data packages from the state stream that are ready for disposal. The graphical state data of a state data package comprises state data necessary to recreate a graphical scene within the respective virtual environment of the corresponding simulation engine at a point in time. The state data package is generated in less time that the length of the simulation cycle, wherein there is a period of time between writing the state data package to the state stream and the initiation of the subsequent simulation cycle.

Some aspects of the present disclosure feature a computing system comprising: one or more hardware processors configured with computer-executable instructions that configure the computing system to: execute a game application; execute a plurality of simulation engines within the game application, wherein each simulation engine is configured to execute game logic that is configured to control simulation of a virtual environment within the game application, wherein each simulation engine is configured to control simulation of a different virtual environment, wherein each virtual environment comprises a plurality of virtual objects registered to the corresponding simulation engine; for each simulation engine, generate simulation state data for each virtual object registered to the simulation engine during a simulation cycle; generate graphical state data based at least in part on the simulation state data generated for the simulation cycle; write the graphical state data for a least a subset of the virtual objects to a state data package during the simulation cycle; after the graphical state data for each virtual object has been written to the state data package, write the state data package to a state stream during the simulation cycle, wherein the state stream is a portion of volatile memory allocated to receive the state data package;

execute a presentation engine within the game application, wherein the presentation engine is configured to generate and render frames for output on a display; select, by the presentation engine, at least a first state data package of a plurality of state data packages during a rendering cycle; read, by the presentation engine, at least the first state data package from the state stream during the rendering cycle; update, by the presentation engine, a graphical state of first virtual environment corresponding to the virtual environment associated with the first state data package, generate, by the presentation engine, a frame based at least in part on the updated graphical state of the first virtual environment and a second state data package, wherein the second state data package was generated by the same simulation engine that generated the first state data package; and render, by the presentation engine, the frame based at least in part on the graphical state data included in the first state data package and the second state data package during the rendering cycle, wherein the presentation engine state data package generates, wherein the presentation engine executes the rendering cycles without further input from the simulation engines after receiving the state data packages.

Various embodiments of the system may include one, all, or any combination of the following features. The simulation cycle and the rendering cycle may be different lengths of time. The one or more processors may be configured with computer-executable instructions that further configure the presentation engine to interpolate the graphical state data included in the first state data package and the second state data package, generate a plurality of frames based on the interpolation, and render the plurality of frames. the simulation cycles for each simulation engine have different lengths of time relative to each other. The one or more processors are configured with computer-executable instructions that further configure each of the plurality of simulation engines to execute independent of each other and the presentation engine, the presentation engine to generate and render frames independent of the execution of simulation engine that generated the state data package. The one or more processors are configured with computer-executable instructions that further configure each simulation engine to write the state data package to a location in non-volatile storage simultaneously with writing the state data package to the state stream. The one or more processors are configured with computer-executable instructions that further configure each simulation engine writes to a different state stream, and each state stream is allocated a different portion of volatile memory to receive the state data package. The graphical state data of a state data package comprises state data necessary to recreate a graphical scene within the respective virtual environment of the corresponding simulation engine at a point in time. The state data package is generated in less time that the length of the simulation cycle, wherein there is a period of time between writing the state data package to the state stream and the initiation of the subsequent simulation cycle.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
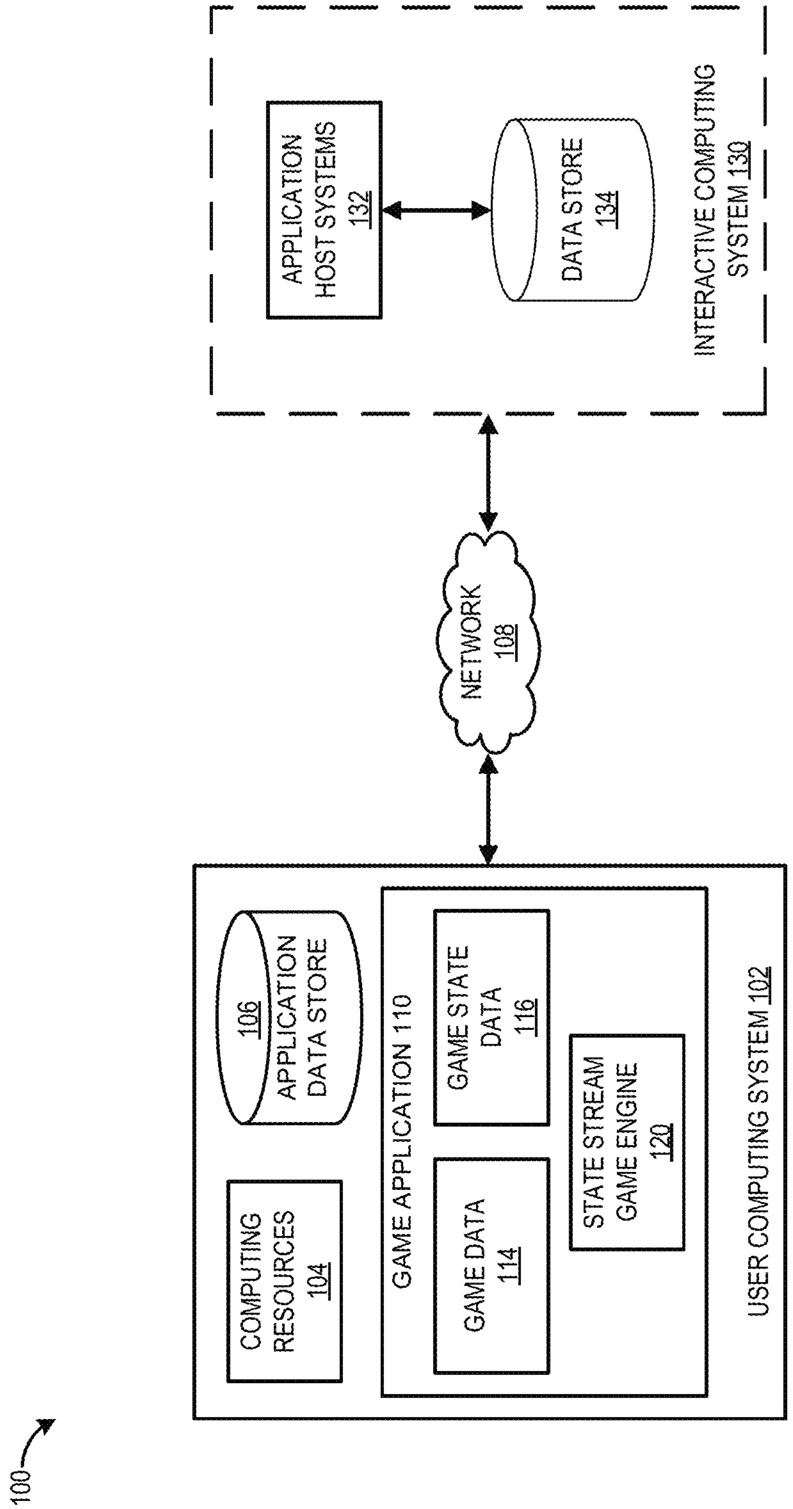
FIG. 1 illustrates an embodiment of a computing environment that can implement one or more embodiments of a state stream video game engine.

One of the difficulties in managing video games is that the processes can be difficult synchronize the simulation and presentation, especially as the games get larger in size and more complex. There can be many dependencies between the simulation of a video game and the rendering of the frames for presentation of the video game. If any of the aspects of the video game simulation lag behind other components, it can create problems with the rendering of frames and presentation to the user. This can result in inconsistencies in the rendering and presentation of gameplay, such as an inconsistent frame rate, which can reduce the quality of the user experience.

The present application provides a solution to this problem by using a state stream game engine. The state stream game engines can decouple the simulation of a video game application from the rendering of the video game application. The simulation of the video game is handled by a simulation engine 122. The rendering of the video game is handled by a presentation engine 124. The data generated by the simulation engine 122 can be communicated to the presentation engine 124 using a state stream.

The simulation engine 122 can execute the game logic and control execution of the game application. The simulation engine 122 can run in its own thread independent of the execution of the presentation engine 124. The simulation engine 122 can write state modifications in the form of a state stream data package (referred to herein as an "SSDP") to the state stream. Communication between the between the simulation engine 122 and the state stream can generally be is one directional communication, where the simulation engine 122 writes the SSDP to the state stream. The simulation engine 122 publishes a SSDP after it is generated during a simulation cycle and writes the SSDP to the state stream. The presentation engine 124 cannot access the SSDP until it is published to the state stream. After the SSDP is finished and published, the simulation engine 122 can begin writing a new SSDP. For example, state (n) is propagated through to state (n+1), and state (n+1) becomes current state.

The simulation engine 122 can publish an SSDP at a defined interval, such as 30 hz. In some embodiments, the SSDP can be generated as soon as a previous simulation cycle is completed. The simulation engine 122 generates graphical state data based on simulation state data. The graphical state data is based on the simulation state data and can include state data that is necessary for the presentation engine 124 to generate a scene within the virtual environment at the point in time that the simulation data is generated. The graphical state data can be a subset of the simulation state data associated with the state of the game application when the SSDP is generated. The presentation can use the graphical state data to render a frame within the virtual environment for presentation.

The presentation engine 124 can read SSDPs from state stream. Generally, the presentation engine 124 does not write to the state stream. The presentation engine 124 can run rendering in its own thread, independent of the simulation engine 122. The SSDPs can store all the graphical state data needed by the presentation engine 124 for rendering a frame. The graphical state data may include static state data, which is the same for the entire lifetime of an object, and dynamic state data, which can change over the lifetime of an object. The presentation engine 124 can interpolate the graphical state data from multiple SSDPs in order to generate and render frames at a higher frequency than the SSDPs are generated by the simulation engine 122. The presentation engine 124 can be responsible for disposing of SSDPs in the state stream after the SSDPs are consumed for rendering. The presentation engine 124 may not use a generated SSDP. For example, the simulation engine 122 may generate SSDPs that are never used by the presentation engine 124. In some embodiments, the presentation engine 124 and can use multiple SSDPs to compose a frame and/or render a sequence of frames. The SSDPs can be configured so that they include no dependencies back to the simulation engine 122. This allows the presentation engine 124 to use the SSDPs independent of the execution of the simulation engine 122. In some embodiments, the presentation engine 124 can use states from different simulation engines 122.

While the description above focused on utilizing state stream game engine in video game applications, it may be understood that the techniques described herein may be applied to different use cases. For example, state stream game engine may be utilized for other types of software applications. For example, the simulation may be based on application logic that is used by a game announcer for an e-sports video game tournament. The video game announcer may have an announcer application that has its own simulation engine 122 and utilizes graphical state data received from a plurality of different computing systems associated with players executing a game application. The announcer application can generate and render frames based on SSDPs received from player's computing systems.

Overview of Video Game Environment

FIG. 1 illustrates an embodiment of a computing environment 100 for implementing a state stream game engine 120. The environment 100 includes a network 108, a user computing system 102, and an interactive computing system 130, which includes at least application host systems 122, and a data store 124. To simplify discussion and not to limit the present disclosure, FIG. 1 illustrates only one user computing system 102, and one interactive computing system 130, though multiple systems may be used.

The user computing system 102 may communicate via a network 108 with the interactive computing system 130. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

A. User Computing Systems

The user computing system 102 may include hardware and software components for establishing communications over a communication network 108. For example, the user systems 102 may be equipped with networking equipment and network software applications (for example, a web browser) that facilitate communications via one or more networks (for example, the Internet or an intranet). The user computing system 102 may have varied local computing resources 104, such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below with respect to FIG. 8.

1. Game Application

The user computing system 102 can execute a game application 110 based on software code stored at least in part in the application data store 106. The game application 110 may also be referred to as a video game, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to game simulation, rendering, animation, and other game data.

In the illustrated embodiment, the user computing system 102 is capable of executing machine readable instructions that are configured to execute the game application 110 stored on a data store on the user computing system (e.g., application data store 106). The game application 110, when executed, includes a state stream game engine 120, game data 114, and game state information 116. The game application, when executed, is configured to generate a virtual environment for a user to interface with the game application 110.

In some embodiments, the user computing system 102 may be configured to execute a game application 110 stored and/or executed in a distributed environment using a client/server architecture. For example, the user computing system 102 may execute a portion of a game application 110 and the interactive computing system 130, or an application host system 132 of the interactive computing system 130, may execute another portion of the game application 110. For instance, the game application may be a massively multiplayer online role-playing game (MMORPG) that includes a client portion executed by the user computing system 102 and a server portion executed by one or more application host systems 132. The game application 110 can execute on the user computing system 102 or a distributed application that includes a portion that executes on the user computing system 102 and a portion that executes on at least one of the application host systems 122. In some embodiments, the game application 110 may execute entirely on the interactive computing system 130, and the interactive computing system 130 may stream the gameplay of the game application 110 to the user computing system 102 over the network 108.

i. State Stream Game Engine

Figure 2A:
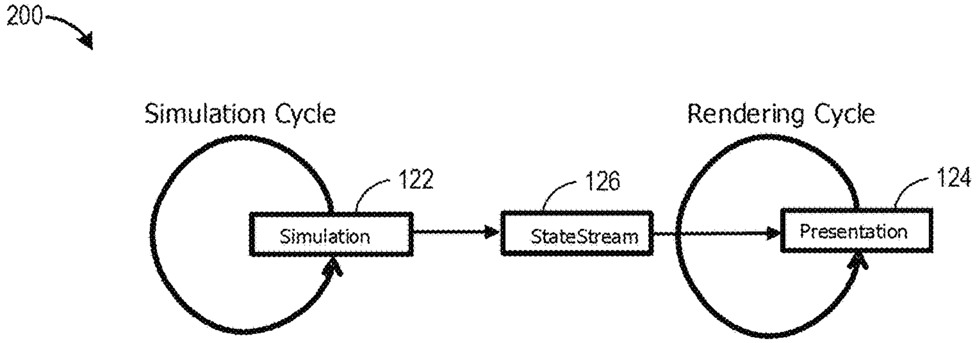
FIGS. 2A-2F provide embodiments of block diagrams illustrating functionality of a state stream video game engine.
Figure 2B:
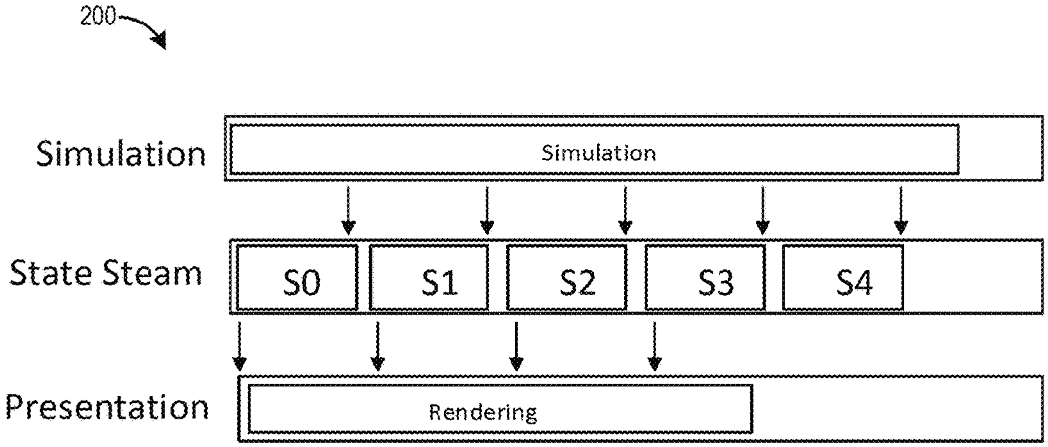

During operation, the state stream game engine 120 executes the game logic, controls execution of the simulation of gameplay, and rendering within the game application 110. The state stream game engine 120 can include a simulation engine 122 and a presentation engine 124 (as illustrated in FIGS. 2A and 2B). The simulation engine 122 can execute the game logic and control execution of gameplay simulation. The presentation engine 124 can control execution of rendering of gameplay frames and the output of the presentation of the frames.

The simulation engine 122 can read in game rules and generates game state based on input received from one or more users. The simulation engine 122 can control execution of individual objects, such as virtual components, virtual effects and/or virtual characters, within the game application. The simulation engine 122 can manage and determine character movement, character states, collision detection, derive desired motions for characters based on collisions. The simulation engine 122 receives user inputs and determines character events, such as actions, collisions, runs, throws, attacks and other events appropriate for the game. The character events can be controlled by character movement rules that determine the appropriate motions the characters should make in response to events. The simulation engine 122 can include a physics engine that can determine new poses for the characters. The physics engine can have as its inputs, the skeleton models of various characters, environmental settings, character states such as current poses (for example, positions of body parts expressed as positions, joint angles or other specifications), and velocities (linear and/or angular) of body parts and motions provided by a character movement module, which can be in the form of a set of force/torque vectors for some or all body parts. From this information, the physics engine generates new poses for the characters using rules of physics and those new poses can be used to update character states. The simulation engine 122 provides for user input to control aspects of the game application according to defined game rules. Examples of game rules include rules for scoring, possible inputs, actions/events, movement in response to inputs, and the like. Other components can control what inputs are accepted and how the game progresses, and other aspects of gameplay.

The simulation engine 122 can output graphical state data that is used by presentation engine 124 to generate and render frames within the game application. Each virtual object can be configured as a state stream process that is handled by the simulation engine 122. Each state stream process can generate graphical state data for the presentation engine 124. For example, the state stream processes can include various virtual objects, such as emitters, lights, models, occluders, terrain, visual environments, and other virtual objects with the game application that affect the state of the game. The execution of the simulation engine 122 is described in further detail herein.

The presentation engine 124 can use the graphical state data to generate and render frames for output to a display within the game application. The presentation engine 124 can combine the virtual objects, such as virtual characters, animate objects, inanimate objects, background objects, lighting, reflection, and the like, in order to generate a full scene and a new frame for display. The presentation engine 124 takes into account the surfaces, colors textures, and other parameters during the rendering process. The presentation engine 124 can combine the virtual objects (e.g., lighting within the virtual environment and virtual character images with inanimate and background objects) to generate and render a frame. The execution of the presentation engine 124 is described in further detail herein.

ii. Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the data store 134, in such embodiments, game data may be received during runtime of the game application.

iii. Game State Data

During runtime, the game application 110 can store game state data 116, which can include a game state, character states, environment states, scene object storage, route information and/or other information associated with a runtime state of the game application 110. For example, the game state data 116 can identify the state of the game application 110 at a specific point in time, such as a character position, character orientation, character action, game level attributes, and other information contributing to a state of the game application. The game state data 116 can include simulation state data and graphical state data. The simulation state data includes the game state data that is used by the simulation engine 122 to execute the simulation of the game application. The graphical state data includes game state data that is generated based on the simulation state data and is used by the presentation engine 124 to generate and render frames for output, such as to a display of the user computing system 102. The graphical state data can be generated by the state stream processes and included in an SSDP.

B. Interactive Computing System

The interactive computing system 130 can include one or more application host systems 132 and account data store(s) 134. The interactive computing system 130 may include one or more computing systems configured to execute a portion of the game application 110 and/or host application 106. In some embodiments, the one or more application host systems 122 can include one or more computing devices, such as servers and databases that may host and/or execute a portion of one or more instances of the game application 110 and/or a host application (not shown). In certain embodiments, instead of or in addition to executing a portion of the game application 110 and/or host application, the application host systems 122 may execute another application, which may complement and/or interact with the application 104 during execution of an instance of the application 104.

1. Application Host System(s)

The interactive computing system 130 may enable multiple users or computing systems to access a portion of the game application 110 and/or host application 106 executed or hosted by the interactive computing system 130. In some embodiments, the portion of the game application 110 executed by application host systems 132 of the interactive computing system 130 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 130. A set of users may be assigned to or may access one instance of the persistent virtual world while another set of users may be assigned to or may access another instance of the persistent virtual world.

In some embodiments, the host application system 132 may execute a hosting system for executing various aspects of a game environment. For example, in one embodiment, the game application 110 may be a competitive game, such as a first person shooter or sports game, and the host application system 132 can provide a dedicated hosting service for hosting multiplayer game instances or facilitate the creation of game instances hosted by user computing devices. In some embodiments, the host application system 132 can provide a lobby or other virtual environment for users to virtually interact with one another. Such environments may include environments for conducting transactions between players, such as an auction house or type of environment for facilitating transactions.

2. Account Data Store

The interactive computing system 130 can include one or more account data stores 134 that are configured to store user account information associated with game applications hosted by the interactive computing system 130 and/or the application host systems 132.

Virtual Environment

As used herein, a virtual environment may comprise a simulated environment (e.g., a virtual space) instanced on a user computing system 102. The virtual environment may be instanced on a server (e.g., an application host system 132 of the interactive computing system 130) that is accessible by a client (e.g., user computing system 102) located remotely from the server, to format a view of the virtual environment for display to a user of the client. The simulated environment may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

The game instance of the game application 110 may comprise a simulated virtual environment, for example, a virtual environment that is accessible by users via user computing systems 102 that present the views of the virtual environment to a user. The virtual environment may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). In some embodiments, the instance executed by the computer components may use synchronous, asynchronous, and/or semi-synchronous architectures.

It should be understood the above description of the manner in which state of the virtual environment associated with the video game is not intended to be limiting. The game application may be configured to express the virtual environment in a more limited, or richer, manner. For example, views determined for the video game representing the game state of the instance of the video game may be selected from a limited set of graphics depicting an occurrence in a given place within the video game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the video game are contemplated.

The game application 110 generates game state data 116 that may be used locally within the game application and may be transmitted to the interactive computing system 130 over network 108. The execution of the instance of the game application 110 may include determining a game state associated with the game application. The game state information may facilitate presentation of views of the video game to the users on the user computing systems 102. The game state information may include information defining the virtual environment in which the video game is played.

The execution of the game instance may enable interaction by the users with the game application and/or other users through the interactive computing system 130. The game application may be configured to perform operations in the game instance in response to commands received over network 108 from user computing systems 102. In some embodiments, users may interact with elements in the video game and/or with each other through the video game.

Users may participate in the video game through client game applications implemented on user computing systems 102 associated with the users. Within the game instance of the video game executed by the state stream game engine, the users may participate by controlling one or more of an element in the virtual environment associated with the video game. The user-controlled elements may include avatars, user characters, virtual environment units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual environment. The user characters may include heroes, knights, commanders, leaders, generals and/or any other virtual environment entities that may possess strength, skills, abilities, magic powers, knowledge, and/or any other individualized attributes. The virtual environment units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the video game.

The user controlled element(s) may move through and interact with the virtual environment (e.g., user-virtual environment units in the virtual environment, non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, and/or other communications. Communications may be received and entered by the users via their respective user computing systems 102. Communications may be routed to and from the appropriate users through server(s) (e.g., through application host system 132).

Execution and/or performance of the user action by state stream game engine 112 may produce changes to the game state, which may reflect progresses and/or results of the user actions. In some examples, state changes caused by the execution of the user actions may be recorded in the application data store 106 and/or data store 134 to facilitate persistency throughout the instance of the video game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual environment. For example, the given user may input commands to construct, upgrade and/or demolish virtual buildings; harvest and/or gather virtual resources; heal virtual user-controlled elements, non-player entities and/or elements controlled by other users; train, march transport, reinforce, reassign, recruit, and/or arrange troops; attack, manage, create, demolish and/or defend cities, realms, kingdoms, and/or any other virtual environment locations controlled by or associated with the users; craft or transport virtual items; interact with, compete against or along with non-player entities and/or virtual environment elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual environment. In some examples, the given user may input commands to compete against elements in an environment within the virtual environment—e.g., Player vs. Environment (PvE) activities. In some examples, the given user may input commands to compete against each other within the virtual environment—e.g., Player vs. Player (PvP) activities.

The instance of the game application 110 may comprise virtual entities automatically controlled in the instance of the game application. Such virtual entities may or may not be associated with any user. As such, the automatically controlled virtual entities may be generated and/or developed by artificial intelligence configured with the game application and/or servers (e.g., application host system(s)) by a provider, administrator, moderator, and/or any other entities related to the game application. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (e.g., application host system 132). As used herein, such automatically controlled virtual environment entities in the instance of the video game are referred to as "non-player entities."

In an online game, the instance of the video game may be persistent. That is, the video game may continue on whether or not individual users are currently logged in and/or participating in the video game. A user that logs out of the video game and then logs back in some time later may find the virtual environment and/or the video game has been changed through the interactions of other users with the video game during the time the user was logged out. These changes may include changes to the simulated physical space, changes in the user's inventory, changes in other users' inventories, changes experienced by non-user characters, and/or other changes.

Embodiments of State Stream Game Engine

FIGS. 2A-2F illustrates an embodiment of the functionality of the state stream game engine 120 in additional detail. In the illustrated embodiment, the state stream game engine 120 comprises the simulation engine 122, the presentation engine 124, and the state stream 126, which are configured to control the execution and the output of rendered frames for display. Generally, the simulation engine 122 is configured to execute the game logic of the game application and control the state of operation. The simulation engine 122 interfaces with the different state generating objects of the game application 110 and provides the simulation and control of the game application 110 based on the various game rules and constraints, and inputs received from users. The simulation engine 122 responds to inputs provided by the user and determines how the game application 110 responds to external inputs as well as internal inputs within the virtual environment. The simulation engine 122 determines how each virtual object acts and reacts within the game application. Generally, the CPU of the computing device executes the functions and processes handled by the simulation engine 122, though execution of the simulation engine 122 is not limited to the CPU. The presentation engine 124 is configured to control the output the presentation of the game application 110 by generating and rendering frames for display on the user computing system 102 or another device. Generally, a GPU of the computing device executes many of the functions and processes handled by the presentation engine 124, though execution of the presentation engine 124 is not limited to the GPU.

FIG. 2A illustrates an example of an embodiment 200 of execution of the state stream game engine 120. The state stream game engine provides a system architecture that provides for the execution of the simulation engine 122 to be decoupled from the execution of the presentation engine 124. The simulation engine 122 generates an SSDP and publishes the SSDP to a state stream 126, which may be managed by a state stream manager. The presentation engine 124 reads SSDPs from the state stream 126 to generate rendered content (e.g., frames) to output. Generally, the simulation engine 122 does not communicate directly with the presentation engine 124. Rather, the simulation engine 122 generates an SSDP and writes the SSDP to the state stream 126. The SSDP is generated and finalized by simulation engine 122 before it is available to the presentation engine 124 on the state stream 126. After finalization of the SSDP, the simulation engine 122 can begin generation of the next SSDP. The presentation engine 124 can access the SSDP only after the SSDP is written to the state stream. The presentation engine 124 uses the SSDP to render frames within the game application 110. The presentation engine 124 can use any of the SSDPs generated by the simulation engine 122 in order to generate and render frames. The execution of the presentation engine 124 can execute at least one cycle behind the execution of the simulation engine 122 because the simulation engine 122 must finalize the SSDP before the presentation engine 124 can begin rendering using the graphical state data included within the SSDP. Some example embodiments of execution of the simulation engine 122 and presentation engine 124 are further illustrated in FIGS. 2D-2F.

The state stream 126 can be a location in volatile cache memory of the user computing device 102. The state stream 126 may be a ring buffer of a defined size within the cache that will continually overwrite SSDPs after a defined period of time. In some embodiments, as will be described in more detail herein, the game application 110 may have multiple simulation engines 122 122 operating concurrently, and the presentation engine 124 can render frames based on the plurality of SSDP's generated by the plurality of simulation engines 122 122. In such embodiments, each simulation engine 122 can be associated with a different state stream such that each simulation engine 122 is assigned a different logical location in the cache memory for writing SSDPs. In some embodiments, all the simulation engines 122 may write to a common state stream.

The simulation engine 122 generates an SSDP during a simulation cycle, the simulation cycle executes at a rate that is independent of a rate of a rendering cycle, during which the presentation engine 124 outputs a rendered frame of the game application. In the illustrated embodiment, the simulation engine 122 has a simulation cycle of 30 Hz. During each simulation cycle, the simulation engine 122 generates and writes an SSDP to the state stream. The presentation engine 124 reads the SSDPs from the state stream 126. The rate at which the presentation engine 124 renders frames can be greater than the rate at which the simulation engine 122 generates SSDPs. The presentation engine 124 can interpolate the SSDPs in order to render frames at a faster rate than the rate at which the SSDPs are generated by the simulation engine 122. Some examples of rendering and interpolation are illustrated in FIGS. 2D-2F. Although in the illustrated example, the simulation engine 122 is running at a fixed rate and the presentation engine 124 is running at a variable rate, the simulation engine 122 and/or the presentation engine 124 can execute at a fixed or variable rate. The SSDP's can be generated at any frequency as defined by the game application and/or the hardware computing resources of the interactive computing system servers and/or the client computing devices. For example, the SSDP's could be generated at 10, 15, 30, 40, 60, 120 Hz, or any other time period. In some embodiments, the simulation cycle may have a variable rate.

Figure 2C:
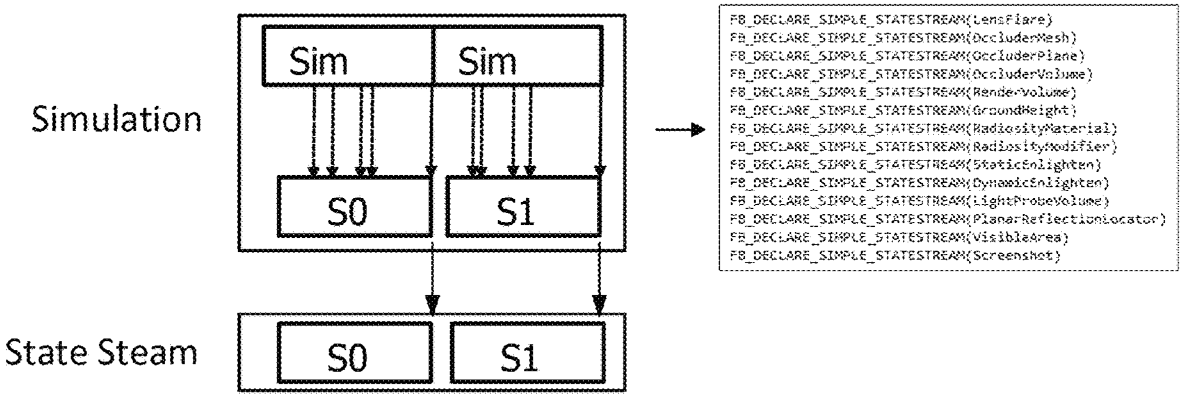
Figure 2D:
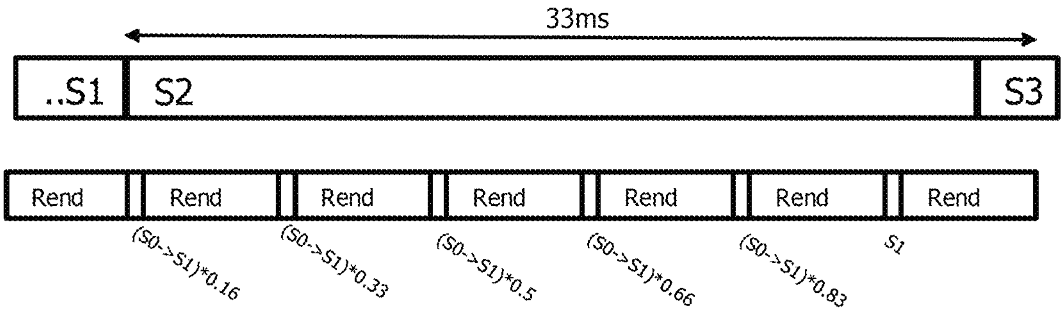
Figure 2E:
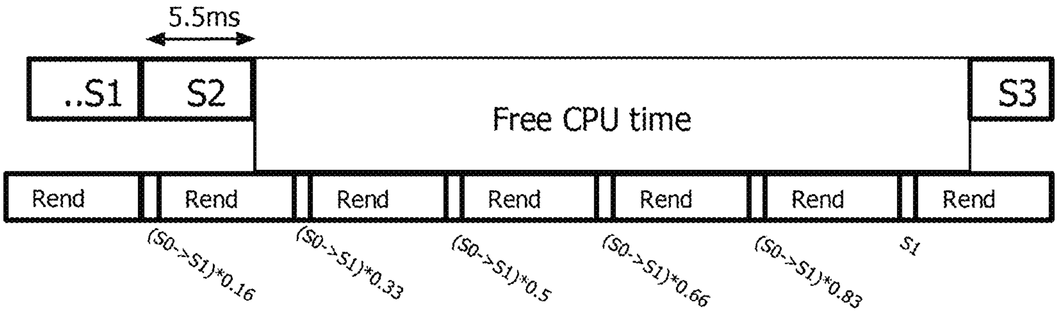
Figure 2F:
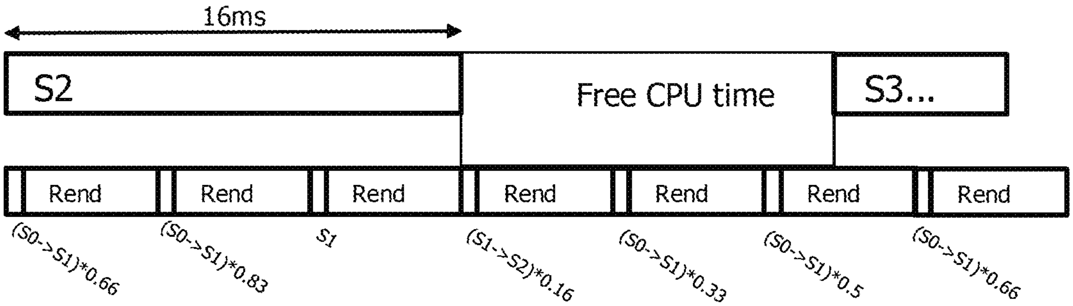

With additional reference to FIGS. 2B and 2C, the embodiment 200 of the state stream game engine 120 is illustrated with additional detail. As illustrated, the simulation engine 122 can generates discrete SSDPs during runtime of the game application, which are illustrated by blocks S0, S1, S2, and so on. The SSDPs are written to the state stream 126 by the simulation engine 122. In some embodiments, the SSDP may be written as a complete block to the state stream 126 or may be written piecemeal to the state stream. In either case, The SSDP is not available to the presentation engine 124 on the state stream until the SSDP is complete and made available to the presentation engine 124. After an SSDP is available, the presentation engine 124 then reads the SSDP from the state stream 126. Generally, communication of the simulation engine 122 and the presentation engine 124 with the state stream is a one-directional. The simulation engine 122 writes to the state stream and the presentation engine 124 reads from the state stream. The simulation engine 122 and presentation engine 124 can operate in different threads. In this manner, the simulation engine 122 can run independent of each other. As long as the presentation engine 124 lags behind the generation of SSDP by the simulation engine 122, then the presentation engine 124 can continue to render without waiting for the generation of the next SSDP. Additionally, since each SSDP contains all the state necessary for rendering, the presentation engine 124 does not have to wait for the computation and generation of state values for individual state stream processes within the SSDP. As illustrated in FIG. 2C, each SSDP is composed of a plurality of individual state stream processes that are generated during each simulation cycle. The generation of the state stream processes are added to the SSDP, and after all the state stream processes have been completed, the SSDP will be finalized and available on the state stream. In some embodiments, the SSDP will be written at a defined rate, such as at 30 Hz. As illustrated, when the cycle is completed and the SSDP is finalized (e.g., S0), the simulation engine 122 can begin generation of the next SSDP (e.g., S1).

The state stream processes comprise the state generating objects within the game application that need to be provided to the presentation engine 124 in order for the presentation engine 124 to have the state information necessary to generate the render state of the game at the point in time that the SSDP is generated. FIG. 2C provides an abbreviated list of example state stream processes that may be included in an SSDP, such as, LensFlare, OccluderMesh, OccluderPlane, OccluderVolume, RenderVolume, GroundHeight, and so forth. Generally, all game systems within a game application can go through state stream. For example, some games systems executed within the game application can include Models, Emitters, Lights, Visual environments, and others. The graphical state data generated for state stream processes can differ from the simulation state data in that, the graphical state data includes a subset of the state necessary for the presentation engine 124 to regenerate the graphical virtual environment at the time that graphical state data was generated. The graphical state data can be a filtered version of the simulation state data associated with the virtual objects that include less than all of the state that is required to execute the game. For each state stream process of a virtual object, the graphical state data can include static state information and dynamic state information. Static state information refers to state information that is the same for the entire life of an object. Dynamic state information refers to state information that changes over the life of an object. The full graphical state of an object at time X (that is, the time at which the SSDP is generated) is the static state information in conjunction with the interpolated dynamic state information.

As discussed, the state data provided by the simulation engine 122 to the state stream 126 is a subset of the simulation state data associated with a virtual object. The graphical state data included in a state stream process provides the state data necessary for the presentation engine 124 to generate the graphical state of the game at particular point in time. The graphical state data can provide static and dynamic state information such as locations, transforms, and any necessary information for the presentation engine 124 to recreate the virtual environment at a particular point in time. The state of the virtual environment is frozen in time when the state stream processes are generated for an SSDP. The presentation engine 124 is capable of using the state information provided within an SSDP to recreate at least a portion of the virtual environment of the game application at the point in time, similar to a freeze frame or screenshot of the virtual environment. In some embodiments, the SSDP may provide a default point of view for generating and rendering the frame (e.g., the player's perspective within the game application). However, the SSDP provides sufficient graphical state data for the recreation of the graphical state of the virtual environment at the point in time of the SSDP and the generation of the graphical state at the time is not limited to a single perspective within the game application (e.g., the player's perspective). The SSDP can provide the state data required to recreate the virtual environment from any angle or camera perspective. This allows the presentation engine 124 to generate and render a frame of the graphical state from any angle or position within the virtual environment, or portion thereof, based on the graphical state data. For example, an action within the game may trigger the creation of frames from a different perspective than the player's default point of view.

As an illustrative example of graphical state data, a wheel on a moving car within an instance of the virtual environment may include static state data used for identifying unchanging characteristics (such as, the mesh and skin of the wheel), and the dynamic state data identifying changing characteristics of the wheel (such as, location of the wheel within the virtual environment and rotation of the wheel about a center axis). The graphical state data of the wheel does not need to include data that is relevant to the simulation of the game, such as the speed of the rotation of the wheel or the speed at which the car is travelling within the virtual environment, but is not relevant or does not affect the rendering of the wheel within the game application. In this example, the 'frozen' state of the wheel would be provided as graphical state data for the wheel state stream process within the SSDP and then written to the state stream. The presentation engine 124 can then use the graphical state data provided within the SSDP to render a frame. The generated frame may or may not include a rendering of the wheel. However, the graphical state data for the wheel would be included within the SSDP in order for the presentation engine 124 to generate the game environment and render a frame from a perspective that would include the wheel in the correct position.

In some embodiments, the graphical state data that is generated for each state stream process can be stored as a difference between the current SSDP and the previous SSDP. The state values of each of the various state variables within the game can be stored as a struct that maintains the state values for an object. In this manner, the simulation engine 122 can determine what the state of an object at any point during the simulation.

In some embodiments, the presentation engine 124 can maintain a copy of the current graphical state data generated by the simulation engine 122. The simulation engine 122 may be configured to only write state values that have changed from the previous state to the SSDP. The presentation engine 124 can use the graphical state data received from the SSDP to update the current graphical state of the virtual environment. In this manner, the size of SSDP can be significantly reduced as compared to generating an entire copy of the graphical state data for the current graphical state of the virtual environment. This can also reduce the amount of time that is required for the simulation engine to generate and finalize an SSDP.

With additional reference to FIGS. 2D-2F, various embodiments of the timing and synchronization of the simulation engine 122 and presentation engine 124 are illustrated. The independence of the execution of the simulation engine 122 and presentation engine 124 provide for a plurality of the different modes of operation of the state stream game engine. FIGS. 2D-2F provide examples of instances of execution of the simulation and rendering cycles. The examples are not limiting and merely provides illustrative examples for executing the state stream game engine. The presentation engine 124 can render frames by interpolation between the previous two SSDPs generated by the simulation engine 122 (e.g., S0 and S1). The illustrated examples provide examples of how the simulation engine 122 and presentation engine 124 execute during a simulation cycle. In the illustrated examples, the presentation engine 124 is executing rendering cycles at 180 Hz and the simulation engine 122 is executing simulation cycles at 30 Hz, which results in six rendering cycles for each simulation cycle.

The presentation engine 124 can render a plurality of frames based on each SSDP. The presentation engine 124 can run at a faster cycle time than the simulation engine 122. For example, the simulation engine 122 may be operating at 30 Hz and the presentation engine 124 is rendering frames at a greater rate (e.g., 180 Hz). The presentation engine 124 will need to generate multiple frames to output to the display between each generation of a SSDP. For example, if the simulation engine 122 generates an SSDP at each simulation cycle at 30 Hz and the presentation engine 124 renders frames at 120 FPS, then the presentation engine 124 would need to generate 4 frames per simulation cycle, or in other words execute four rendering cycles per simulation cycle. The presentation engine 124 can use a previous SSDP (e.g., S0) and the current state (S1) in order to determine interpolation of the graphical states of the virtual environment. In some embodiments, the presentation engine can lag behind the simulation current cycle by more than one cycle. For example, the presentation can use S0 and S1 for generation of frames even though the current cycle is S4.

The presentation engine 124 does not write or change the values of the states of the graphical state data that is written to the state stream by the simulation engine 122. The presentation engine 124 can perform functions of cleaning up SSDPs after they have been consumed by the presentation engine 124 and are no longer needed. Once the presentation engine 124 has fully consumed a state, or if a state was never used, the state can be deleted from the state stream, or flagged for deletion or overwriting.

FIG. 2D illustrates an embodiment in which the simulation engine 122 generates and finalizes an SSDP at the end of the simulation cycle, such that S2 is completed just prior to the end of the sixth rendering cycle. If generation of the SSDP takes the entire simulation cycle to complete. After the simulation engine 122 completes the SSDP (S2), simulation engine 122 immediately begins the next SSDP (S3). The presentation engine 124 can continue to render frames without las as long as the SSDP completes prior to the end of the sixth rendering cycle. In this embodiment, there is no buffer between the time that the SSDP is completed and the rendering for the next rendering cycle needs to commence. In which case, if the finalization of the SSDP is delayed, the next rendering cycle can be delayed as well.

FIG. 2E illustrates an embodiment in which the simulation engine 122 generates and finalizes an SSDP prior to the end of the simulation cycle, such as in 5.5 milliseconds of the total 33 milliseconds allocated to the simulation cycle time. Since generation of the SSDP takes only a portion of the simulation cycle to complete, the simulation engine 122 can dedicate processing resources to other processes, such as rendering prior to initiation of the next SSDP (S3). At the beginning of the next simulation cycle, the simulation engine can generate the next SSDP. The length of time the simulation engine takes to generate the SSDP may differ based on the simulation of the game. For example, more dynamic simulation processes where many state values are changing can result in the generation of SSDPs at a slower rate (such as illustrated in FIG. 2D) than compared to when a user is in a menu selection screen within the simulation of the game application 110.

FIG. 2F illustrates an embodiment in which the simulation engine 122 generates and finalizes an SSDP prior to the end of the simulation cycle, such that S2 is completed with a buffer of time prior to the end of the sixth rendering cycle. Generation of the SSDP takes only a portion of the simulation cycle to complete. After the simulation engine 122 completes the SSDP (S2), simulation engine 122 can dedicate processing resources to other processes, such as rendering prior to initiation of the next SSDP (S3). In this embodiment, the simulation engine has a variable simulation cycle and the simulation engine begins generating an SSDP that does not follow a fixed simulation cycle duration. The SSDP can include the time that the simulation cycle took to complete the SSDP. This information can be used by the presentation to predict the number of rendering cycles between simulation cycles. This can be also be used when the simulation cycle takes longer than the determined simulation cycle time. For example, if the creation of the SSDP took 55 milliseconds, the presentation engine can predict that the more rendering cycles will need to be completed prior to receiving the next SSDP. In such a case, the presentation can adjust the interpolation of the SSDPs and the number of rendering cycles based on the prediction.

State Stream Game Engine with Replay Functionality

Figure 3:
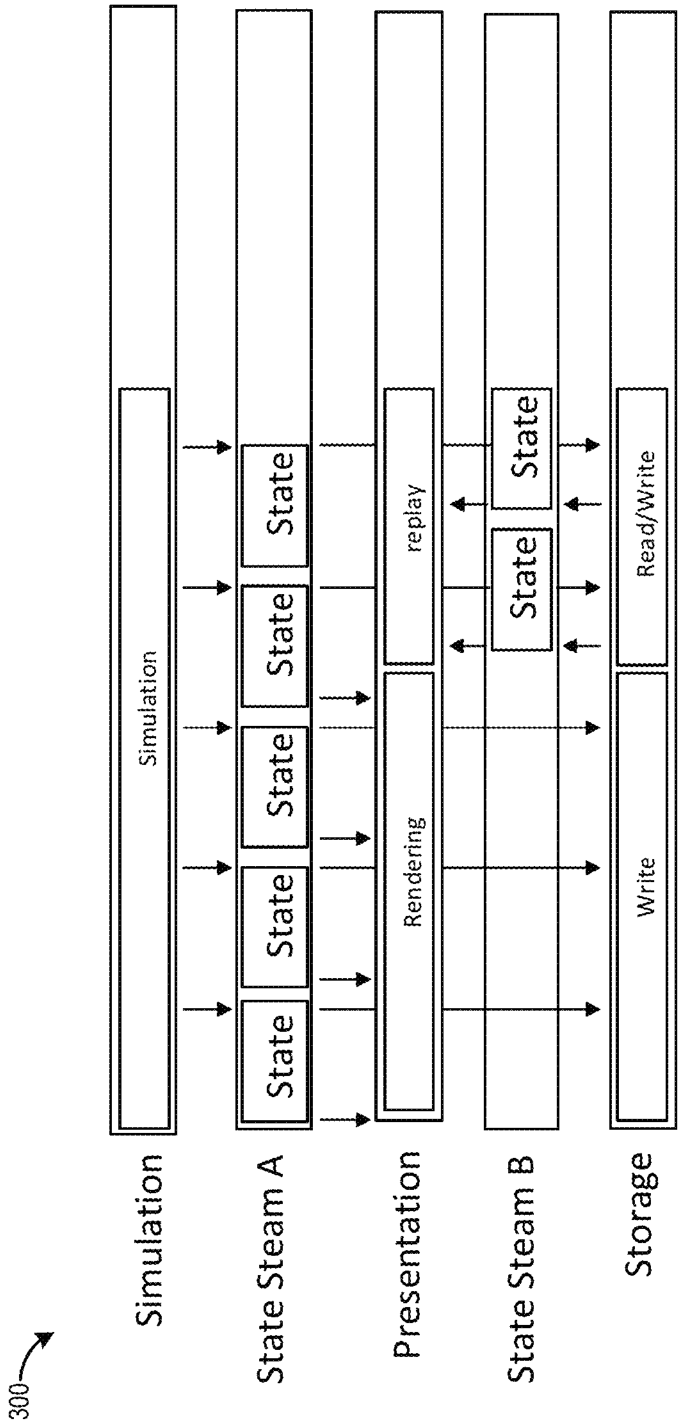
FIG. 3 illustrates an embodiment of a block diagram of a state stream game engine configured to implement replay functionality.

FIG. 3 illustrates a block diagram 300 of a state stream game engine that includes replay functionality. In the illustrated embodiment, the replay functionality can be implemented by writing the SSDPs to the state stream and to storage simultaneously. Generally, after the state is consumed by the presentation engine 124, it is removed from the state stream and no longer available to use for rendering by the presentation engine 124. However, the SSDP can be persistently saved by having the simulation engine 122 simultaneously write to a storage location, such as non-volatile memory, on the computing device. The storage location can be written to a different location on the computing device than what is designated and allocated for the state stream. The presentation engine 124 can load the states from the disk to the state stream in order to consume the states again. In the illustrated example, the SSDP is being written from the storage to a second state stream. Though illustrated as a second state stream, the first state stream and the second state stream may be the same allocated memory location on the computing device. In some embodiment, the state stream game engine may have different state streams with different allocated memory locations.

The SSDPs written to memory may be used for replaying the sequences of a gameplay session. For example, if a user wanted to watch a replay of highlights of a game, the SSDPs associated with the requested sequence of events could be written from storage into state stream. The presentation engine 124 could generate and render the frames for the SSDPs in order to display a replay to the user. The data could be displayed in the same manner and angle that was originally provided to the user during gameplay of the game, such as a goal in a soccer game. Additionally, the state data includes the state data necessary for the presentation engine 124 to recreate the virtual scene within the game application, the presentation engine 124 can render the replay from a different perspective or point of view within the game environment. For example, the replay may provide the replay of a goal scored by the player, which can be displayed from the goal scorer's point of view, the goal keeper's point of view, a bird's eye point of view, or any other point of view. The recreation of the scene can be controlled by a display manager of the presentation engine 124. In some embodiments, the simulation engine may generate a display manager SSDP that can be used by the presentation engine to determine the point of view that is being output for display. For example, during gameplay the display manager SSDP can provide instructions for the presentation engine to use the SSDP from state stream A and during a replay, the display manager SSDP can provide instructions for the presentation engine to use the SSDP from state stream B.

The SSDPs written to storage during the gameplay session may be stored in a ring buffer. The ring buffer may cycle through a defined amount of gameplay time, such as 10 minutes, 15 minutes, or another amount of defined time. Some of the SSDPs can be flagged so that they are not overwritten when the ring buffer cycles through. The SSDPs may be flagged based on specific events that occurred during gameplay, such as scoring a goal, or based on other criteria defined by the specific rules and parameters of the game application. Generally, after an SSDP is consumed, the presentation engine 124 manages the removal of the SSDP from the state stream. In the case of SSDPs that are written into the state stream from storage, the SSDP may be rewritten into storage or not removed from storage when written into the state stream prior to consumption by the presentation engine 124.

In some embodiments, the presentation engine 124 can utilize multiple different SSDPs to generate and render a frame. The presentation engine 124 may pull state information from any number of states in order to generate a frame. For example, the presentation engine 124 may generate a series frames by combining multiple states together to create a collage of graphics generated from multiple different states.

State Stream Game Engine with Multiple Simulation engines 122

Figure 4:
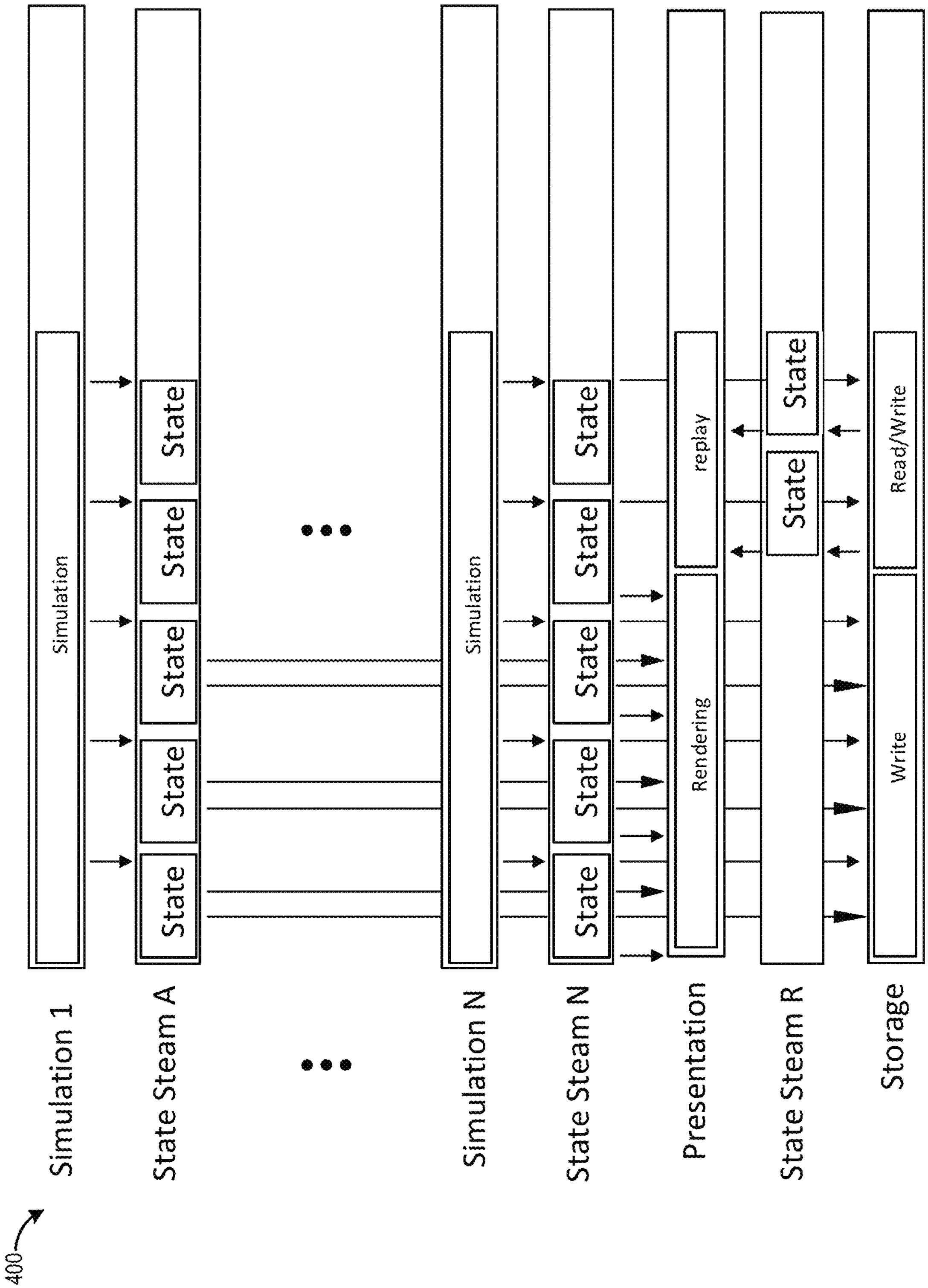
FIG. 4 illustrates an embodiment of a block diagram of a state stream game engine configured to implement multiple simulation engines 122.

FIG. 4 illustrates a block diagram 400 of a state stream game engine that includes multiple simulation engines 122. In the illustrated embodiment, the multiple simulation engines 122 can generate state information simultaneously. The multiple simulation engine 122's may be generating SSDPs for different aspects of a video game. For example, a first simulation engine 122 may be configured to generate state for a first virtual character in a first virtual environment (e.g., a first virtual world) within the game application. The second simulation engine 122 can be configured to generate state for a second virtual character in a second virtual environment (e.g., a second virtual world) within the game application. The independent state engines can independently determine the state associated with each virtual world, which may be governed by different rules of operation and constraints within the game application. For example, the game application may have a persistent virtual environment that continues to execute independent of the virtual characters within the persistent virtual environment. As illustrated, each simulation engine 122 can write the SSDPs to a state stream allocated for the simulation engine 122. In some embodiments, the state stream game engine may have a common state stream for all simulation engines 122.

The presentation engine 124 can use the data to generate frames that includes state information from multiple simulation engines 122. As an illustrative example, the game application may generate frames that include state information received from a first virtual character in a first virtual environment (with SSDPs generated by a first simulation engine 122) and from a second virtual character in a second virtual environment (with SSDPs generated by a second simulation engine 122). In this example, the game application may include persistent virtual environments in which the state continues to generate regardless of whether the user is actively playing either the first or second virtual character. The user may select to view only one character, in which case, the SSDPs from simulation engine 1221 or simulation engine 1222 would be used to generate frames for display to the user. The user may choose to have a picture in picture view of the second character while the first character is active or visa-versa. The presentation engine 124 can then use the SSDPs from simulation engine 1221 and simulation engine 1222 to generate the frame. In some embodiments, one or more of the simulation engine may generate a display manager SSDP that can be used by the presentation engine to determine the point of view that is being output for display. The presentation engine 124 can be responsible for disposing of consumed and or unused SSDPs within a state stream.

In some embodiments, the different simulation engines 122 may be generated on different computing systems. The simulation engine 122 can then send the SSDP to another computing system over a network. In such a case, the latency of the network connection would need to be factored into the timing and transmission of the SSDP between computing devices. In an illustrative example, in a competitive gaming environment, each computing system associated with a player may send SSDPs, generated by their simulation engine 122, to an announcer computing system. The presentation engine 124 of the announcer computing system can be a different type of presentation engine 124 that the player computing systems. The announcer presentation engine 124 may be configured to have different functionality and/or display options for controlling and/or generating frames that contain graphical state information received from the respective SSDPs. The announcer computing system may also include a different simulation engine 122 specific to the announcer computing system in order to execute a different type of application than the player computing systems.

In some embodiments, a game application may stop or suspend operation of simulation engines 122 during execution of the game application. The multiple simulation engines 122 may be executed in series or in in parallel based on the functionality and/or constraints of the game application. Prior to stopping operation of a simulation engine 122, a simulation engine 122 can generate SSDPs that can be configured to be used at different times within the game application. Depending on what is being presented by the presentation engine 124 (such as, a prerendered cut scene), the simulation engine 122 may have the budget to generate additional SSDPs that are not intended to be displayed as they generated. Rather, these SSDPs can be written to storage. These SSDPs can be used for the generation of frames at another point in time and under different conditions. For example, the state that is being generated for the presentation engine 124 to be displayed at a different time(s) within the game application. In one embodiment, when a simulation engine 122 is going to be terminated, the simulation engine 122 can generate a number of SSDPs that are determined to be used within a game after the new simulation engine 122 is being implemented. For example, a simulation engine 122 (SE1) may generate SSDPs for the destruction of a virtual planet controlled by simulation engine 1221. When the user transitions to a new virtual planet, which is controlled by a new simulation engine 122 (SE2), the SSDPs associated with destruction of the virtual planet may be used by presentation engine 124 to generate frames displaying the destruction of the virtual planet, even though simulation engine 1221, which generated the SSDPs, is no longer executing.

The execution of multiple simulation engines 122 and preparation of SSDPs provides for a presentation engine 124 to operate completely independent and decoupled from the operations of the simulation engine 122. The presentation engine 124 can generate and render frames based on state information received from any SSDP regardless of whether the simulation engine 122 is currently executing or executing on the same computing system as the presentation engine 124. Additionally, the presentation engine 124 generating and rendering frames can be a different type of presentation engine 124 with different functionality than the presentation engine 124 that is being used on computing systems that is playing the game application and generating the SSDPs.

State Stream Game Engine for Multiplayer Game Application

Figure 5:
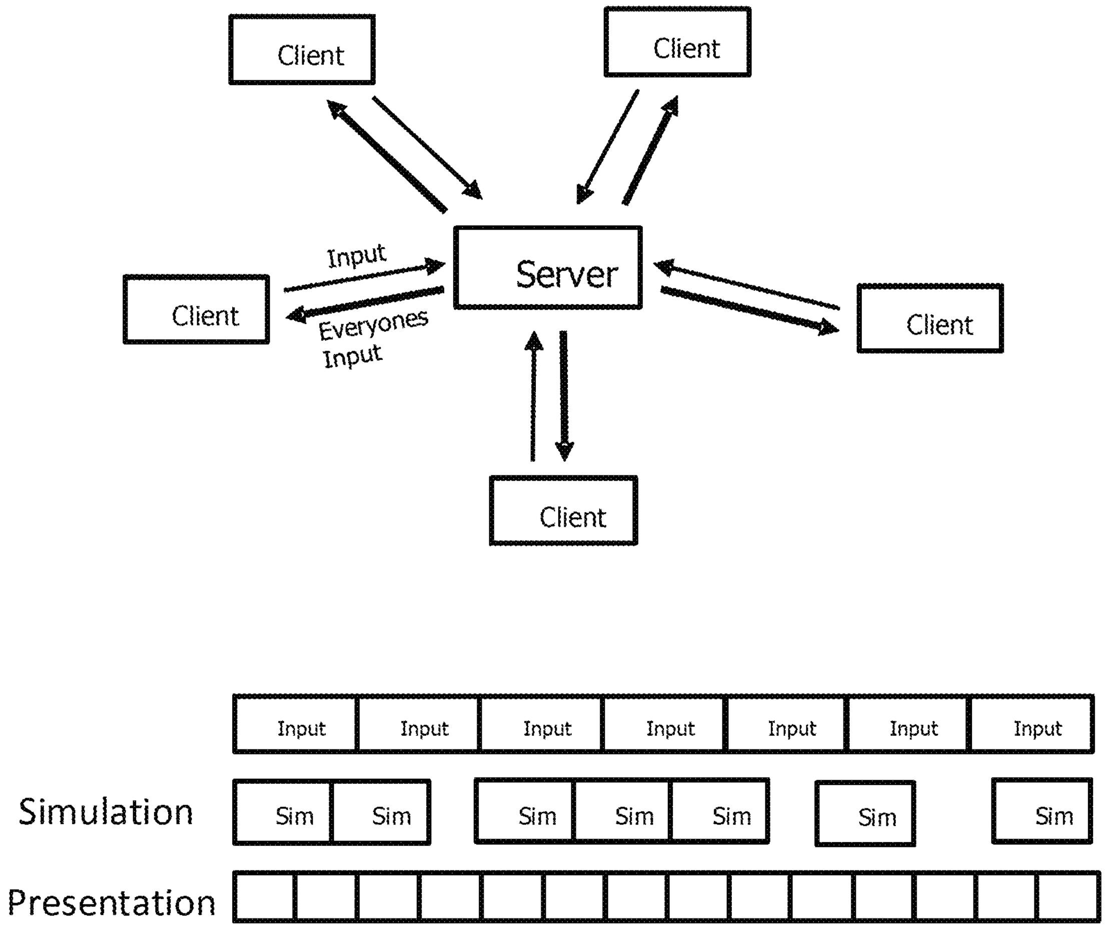
FIG. 5 illustrates an embodiment of a computing environment for implementing an embodiment of the state stream game engine in a multiplayer game application.

FIG. 5 illustrates a block diagram 500 of a state stream game engine that is executing in a multiplayer game application environment where the execution of the state of each client computing system within the simulation of the game application is synchronized. The synchronization of the game application requires that each client computing device is operating on the same simulation clock and each is executing the same time cycle at the same time. In such an embodiment, the behavior of the generation of the SSDPs by the simulation engines 122 may not be generated when the client computing device completes the simulation cycle. Rather, the SSDP is only generated after certain criteria are satisfied. For example, an SSDP may not be finalized until the server receives input from each player (through their client computing system) participating in a multiplayer game. In some embodiments, the simulation engine 122 will only generate the SSDPs when each of the client systems has provided their input to the simulation engine 122 and the simulation engine 122 receives an indication from the server that the cycle is complete. In instances where there is peer-to-peer communication (such as, a two player game), the simulation engine 122 may not proceed until the input is received from the other player. In such embodiments, the simulation can be heavily dependent upon network latencies, as each player's simulation is dependent on the highest latency client. This can have a significant effect on the quality of gameplay within the game. The game application may have thresholds the govern what happens when the latency of a client is too great and is adversely affecting the simulation. For example, when one of the players has a network latency that is too high, the player may be kicked out of the game. Additionally, in these embodiments, the network connections can result in periods of high and low latency, which can result in bursts of SSDPs that are generated. In order to accommodate the aperiodic nature of the generation of the SSDPs, the presentation engines can be configured so that the rendering of frames is based on frames that are more than one cycle behind the simulation cycle. The number of cycles can be based on the predicted latencies, the game application and other factors. By lagging behind a plurality of cycles, the presentation engine can provide rendered frames at a consistent rate without being affected by the inconsistent generation of simulation cycles.

State Stream Execution Processes

FIGS. 6A-6B and 7A-7B illustrate embodiments of flowcharts for executing processes of a state stream game engine within a game application. The processes, in whole or in part, can be implemented by CPUs and/or GPUs configured with computer readable instructions to execute a game application. For example, the process, in whole or in part, can be implemented by the game application, state stream game engine, simulation engine 122, state stream, and/or the presentation engine 124. Although any number of systems, in whole or in part, can implement the processes, to simplify discussion, the processes will be described with respect to the game application, state stream game engine, simulation engine 122, state stream, and/or the presentation engine 124.

Simulation Engine Execution Process

Figure 6B:
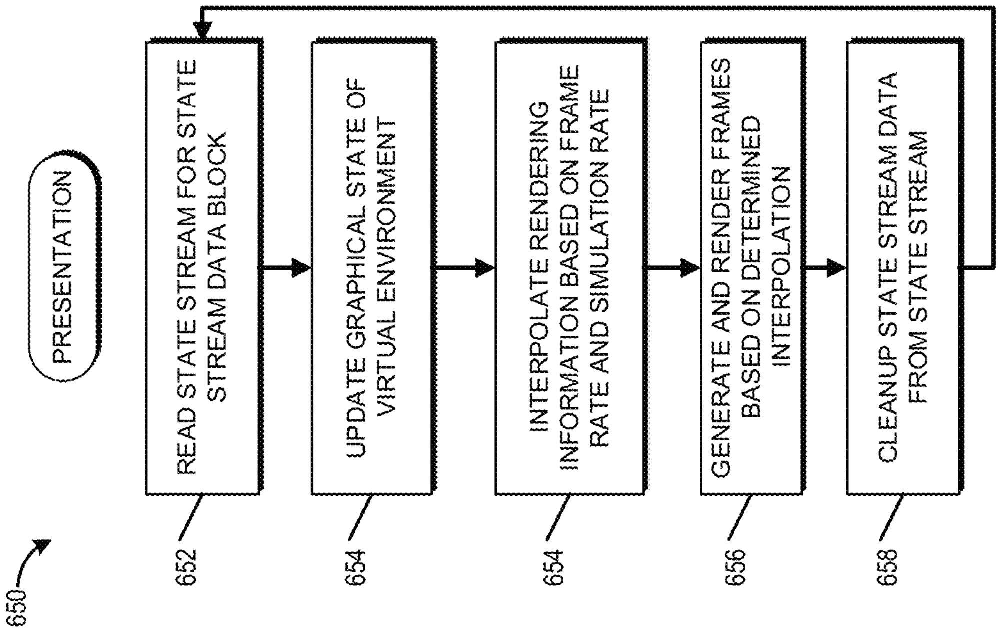
FIGS. 6A-6B illustrate an embodiment of a flowchart of a process for executing a game application using a state stream game engine.
Figure 6A:
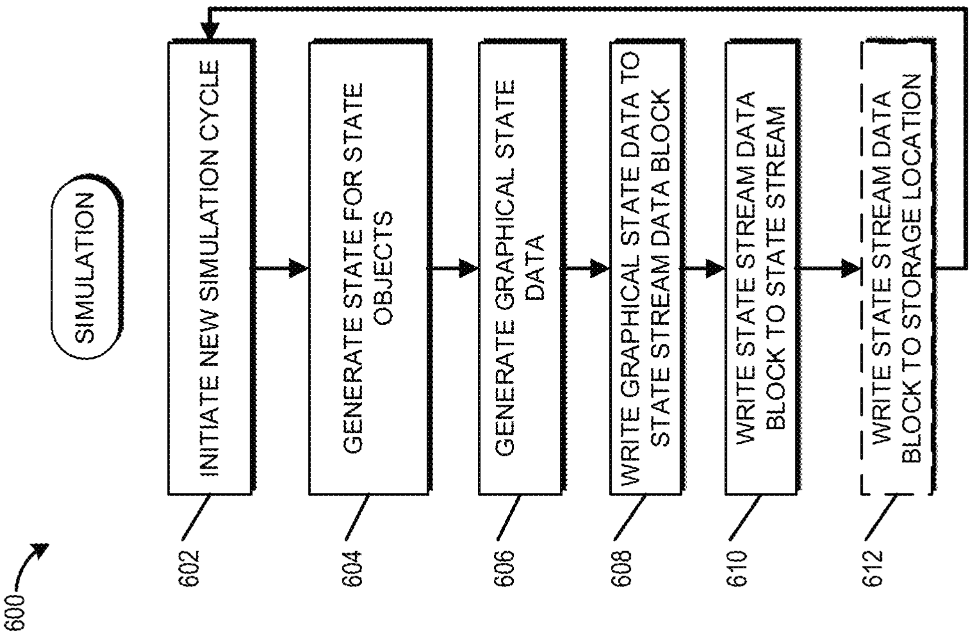

FIG. 6A illustrates an embodiment of a process 600 for execution of a simulation engine 122 during a simulation cycle within the state stream game engine.

At block 602, a simulation engine 122 initiates a new SSDP for a simulation cycle. The new SSDP can be initiated immediately after a previous SSDP (such as, illustrated in FIG. 2D), or there may be a time period between the previous SSDP and the new SSDP (such as, illustrated in FIGS. 2E-2F). The simulation cycle can be configured to occur on a periodic basis (such as, every 30 Hz), an aperiodic basis (such as, as soon as the previous cycle completed), or based on requirements of the game application (such as, after receiving input from other user computing devices in a multiplayer game).

At block 604, the simulation engine 122 generates state data for at least a portion of the virtual objects within the simulation. During the simulation cycle, the simulation engine can generate new state data for virtual objects within the virtual objects. The simulation may only generate state data for virtual objects where the state data changed in the current simulation cycle compared to the previous simulation cycle. In some embodiment, state data for all virtual objects are generated in each simulation cycle. The simulation engine may only generate state data that is associated with a portion of the virtual environment. For example, in an online game, the simulation engine may only have access to a portion of the total state data associated with the virtual environment.

At block 606, the simulation engine 122 generates graphical state data for state stream processes that are necessary for presentation engine 124 to render virtual objects within the virtual environment. The graphical state data can be a subset of the simulation state data. The simulation engine may not generate any data for state stream process where the state did not change when compared to the previous simulation state.

At block 608, the simulation engine writes the graphical state data to the SSDP. The graphical state data for state stream process can be written to the SSDP as soon as the graphical state data is generated.

At block 610, the simulation engine 122 finalizes the SSDP and makes the SSDP available to the presentation engine on the state stream. The simulation engine may write the SSDP to the state stream as a single block or may write to the state stream during the simulation cycle and not finalize or otherwise make the SSDP available until the SSDP is complete. The finalized SSDP can be written to the state stream at the time designated by the timing of the simulation cycle. The state stream can be a location in volatile cache memory that is allocated for the simulation engine 122. The write can be one-directional, from the simulation engine 122 to the state stream. In some embodiments, the SSDP can have a defined time period in which to generate and write the SSDP to the state stream. The SSDP may be completed prior to the end of a simulation cycle. For example, a SSDP may be completed halfway through the simulation cycle.

At block 612, optionally, the simulation engine 122 writes the SSDP to an allocated storage location, simultaneously with the SSDP written to the state stream. The allocated storage location may be located in non-volatile storage on a storage device. After the write is complete, the process returns to block 602

Presentation Engine Execution Process

FIG. 6B illustrates an embodiment of a process 650 for execution of a presentation engine 124 within the state stream game engine.

At block 652, the presentation engine 124 reads at least one SSDP from the state stream for a new rendering cycle. The read is one-directional. The presentation engine 124 does not write modify the graphical state data included in the SSDP. The presentation engine 124 does not read data directly from the simulation engine 122.

At block 654, the presentation engine can update the current graphical state of the virtual environment based on the SSDP. The presentation engine can maintain the current graphical state of each virtual environment. Based on the SSDP, the presentation engine can then update the current state based on the state values that were changed and provided by the SSDP.

At block 656, the presentation engine 124 uses the SSDP (SSDP1) and a previous SSDP (SSDP0) to determine interpolation for rendering of frames based at least in part on a rendering frame rate and a simulation cycle time period. When the simulation cycle occurs at a defined periodicity, the presentation engine 124 can determine the interpolation calculations based on the calculated frame rate. The presentation engine can predict the number of rendering cycles based on a predicted or defined simulation rate and the predicted or defined frame rate.

At block 658, the presentation engine 124 renders frames based on determined interpolation. The frames can be rendered using the graphical state data from SSDP1 and SSDP0. In some embodiments, graphical state data can be used from more than one SSDP in order to render one or more frames. In some embodiments, the presentation engine may use SSDPs for rendering that are a plurality of states behind a current state. The presentation engine 124 can generate and render frames using the SSDPs without any interaction or dependencies to the simulation engine 122.

At block 660, after the rendering cycle is complete and the SSDP is no longer needed from the state stream, the presentation engine 124 can clean up or otherwise tend to the disposal of the SSDP. The presentation engine 124 may delete one or more SSDPs from state stream. In some embodiments, the presentation engine 124 may delete SSDPs that were consumed and/or SSDPs that were not consumed, but are no longer needed. In some embodiments, the state stream is a ring buffer, and the presentation engine 124 flags SSDPs within the ring buffer that can be overwritten. After the rendering cycle is complete, the process returns to block 652.

Execution Process for Multiple Simulation Engines 122

Figure 7B:
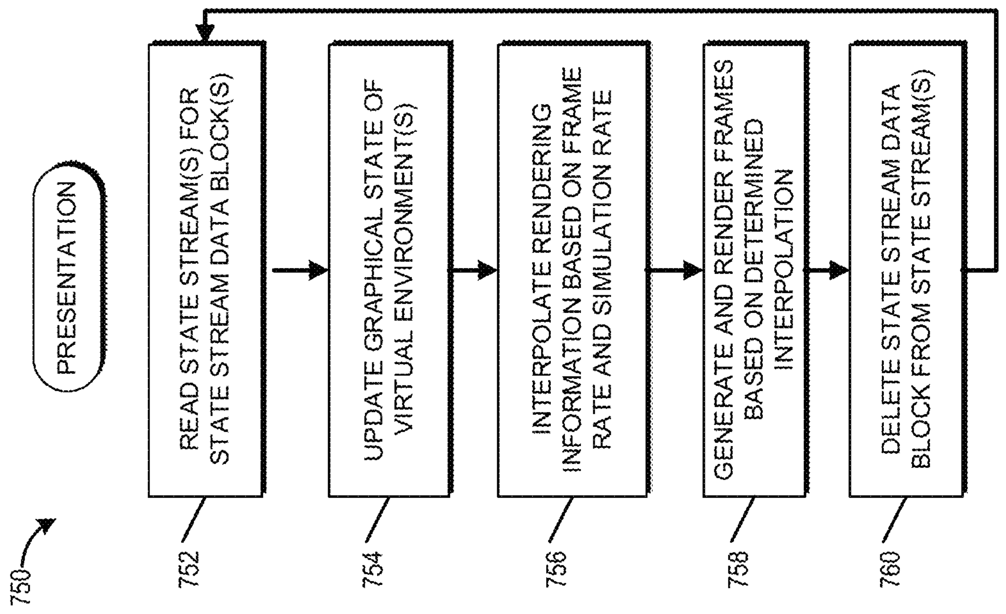
FIGS. 7A-7B illustrate an embodiment of a flowchart of a process for executing a game application using multiple simulation engines 122 in a state stream game engine.
Figure 7A:
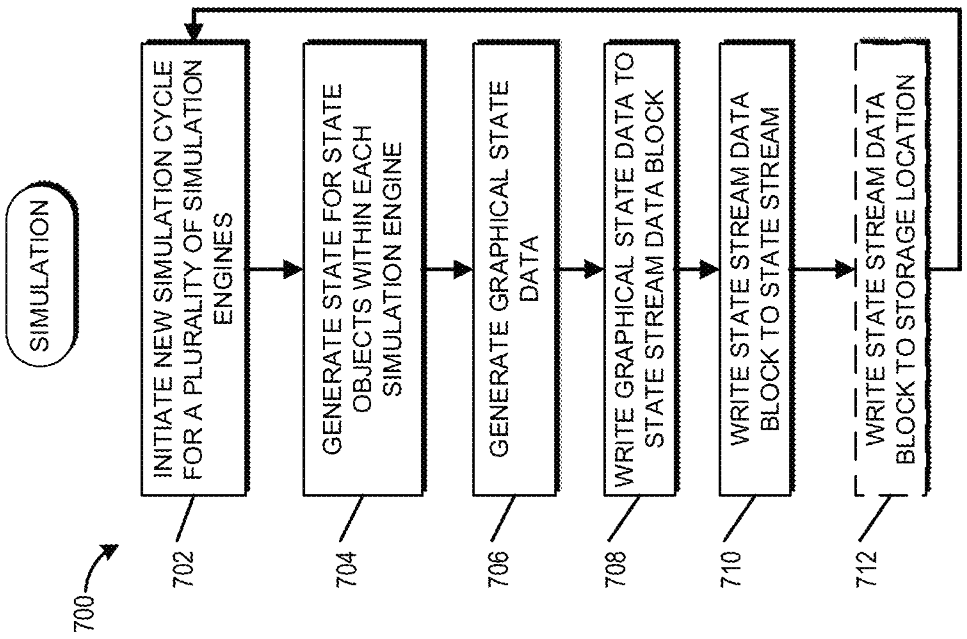

FIG. 7A illustrates an embodiment of a process 700 for execution of multiple simulation engines 122 during a simulation cycle within the state stream game engine.

At block 702, a plurality of simulation engines 122 initiate new SSDPs for a simulation cycle. The simulations cycles for each simulation engine 122 may be synchronized or may be out of synchronization. Each simulation engine 122 runs completely independently of the other simulation engines 122. There may be no execution dependencies between the simulation engines 122. Each simulation engine 122 can generate an SSDP without input from another simulation engine 122. The new SSDP can be initiated immediately after a previous SSDP (such as, illustrated in FIG. 2D), or after a time period between the previous SSDP and the new SSDP (such as, illustrated in FIGS. 2E-2F). The simulation cycle can be configured to occur on a periodic basis (such as, every 30 Hz), an aperiodic basis (such as, as soon as the previous cycle completed), or based on requirements of the game application (such as, after receiving input from other user computing devices in a multiplayer game). At least one of the simulation engines may be configured to generate a display manager SSDP that includes data indicating how to combine the graphical state data from the various SSDPs for rendering a frame.

At block 704, each simulation engine 122 generates state data for at least a portion of the virtual objects within the simulation. During the simulation cycle, the simulation engine can generate new state data for virtual objects within the virtual objects. The simulation may only generate state data for virtual objects where the state data changed in the current simulation cycle compared to the previous simulation cycle. In some embodiment, state data for all virtual objects are generated in each simulation cycle. The simulation engine may only generate state data that is associated with a portion of the virtual environment. For example, in an online game, the simulation engine may only have access to a portion of the total state data associated with the virtual environment.

At block 706, each simulation engine 122 generates graphical state data for state stream processes that are necessary for presentation engine 124 to render virtual objects within the virtual environment. The graphical state data can be a subset of the simulation state data. The simulation engine may not generate any data for state stream process where the state did not change when compared to the previous simulation state.

At block 708, each simulation engine writes the graphical state data to the SSDP. The graphical state data for state stream process can be written to the SSDP as soon as the graphical state data is generated.

At block 710, each simulation engine 122 finalizes the SSDP and makes the SSDP available to the presentation engine on the state stream. The simulation engine may write the SSDP to the state stream as a single block or may write to the state stream during the simulation cycle and not finalize or otherwise make the SSDP available until the SSDP is complete. The finalized SSDP can be written to the state stream at the time designated by the timing of the simulation cycle. The state stream can be a location in volatile cache memory that is allocated for the simulation engine 122. The write can be one-directional, from the simulation engine 122 to the state stream. In some embodiments, the SSDP can have a defined time period in which to generate and write the SSDP to the state stream. The SSDP may be completed prior to the end of a simulation cycle. For example, a SSDP may be completed halfway through the simulation cycle.

At block 712, optionally, the simulation engine 122 writes the SSDP to an allocated storage location, simultaneously with the SSDP written to the state stream. The allocated storage location may be located in non-volatile storage on a storage device. After the write is complete, the process returns to block 702

Execution Process for Presentation Engine with Multiple Simulation Engines

FIG. 7B illustrates an embodiment of a process 750 for execution of a presentation engine 124 interfacing with multiple simulation engines 122 within the state stream game engine.

At block 752, the presentation engine 124 identifies a plurality of SSDPs from one or more state streams for a new rendering cycle. The presentation engine 124 does not write to the state stream. The presentation engine 124 does not read data directly from the simulation engine 122. The presentation engine 124 reads multiple SSDPs from different simulation engines 122. In some embodiments, the presentation engine reads a display manager SSDP that includes data indicating how to combine the graphical state data from the various SSDPs for rendering a frame.

At block 754, the presentation engine can update the current graphical state of each virtual environment based on the SSDPs. The presentation engine can maintain the current graphical state of each virtual environment. Based on the SSDPs, the presentation engine can then update the current state based on the state values that were changed and provided by the SSDPs.

At block 756, the presentation engine 124 uses the multiple SSDPs and a previous SSDPs to determine interpolation for rendering of frames based at least in part on a rendering frame rate and a simulation cycle time period. When the simulation cycle occurs at a defined periodicity, the presentation engine 124 can determine the interpolation calculations based on the calculated frame rate. The presentation engine can predict the number of rendering cycles based on a predicted or defined simulation rate and the predicted or defined frame rate.

At block 758, the presentation engine 124 renders frames based on determined interpolation and the current states of the virtual environments. The frames can be rendered using the graphical state data from the plurality of SSDPs from each of the simulation engines 122. The graphical state data can be used to create a frame for rendering from the plurality of SSDPs. In some embodiments, based on presentation parameters within the game application, only graphical state data from one of the SSDPs are used to generate and render a frame. The presentation engine 124 can generate and render frames using the SSDPs without any interaction or dependencies to the simulation engines 122. In some embodiments, the presentation engine can use data received from a display manager SSDP to determine how to use the generate the frames based on the current states of each virtual environment.

At block 760, after the rendering cycle is complete and the SSDP is no longer needed from the state stream, the presentation engine 124 can clean up or otherwise tend to the disposal of the SSDP(s). The presentation engine 124 may delete one or more SSDPs from state stream. In some embodiments, the presentation engine 124 may delete SSDPs that were consumed and/or SSDPs that were not consumed, but are no longer needed. In some embodiments, the state stream is a ring buffer, and the presentation engine 124 flags SSDPs within the ring buffer that can be overwritten. After the rendering cycle is complete, the process returns to block 752.

Overview of Computing Device

Figure 8:
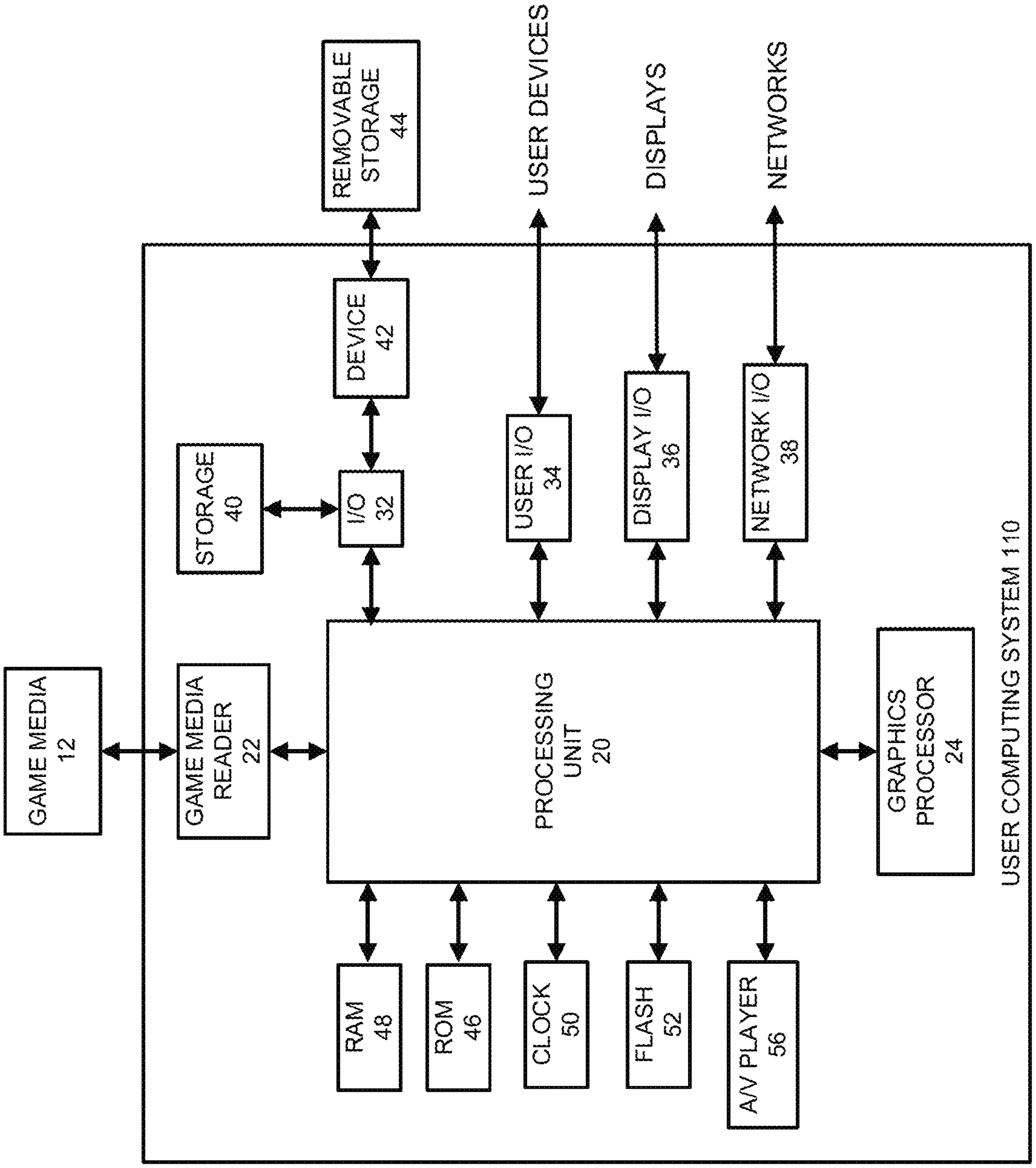
FIG. 8 illustrates an embodiment of a computing device.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may" unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for executing a multiuser game application on a computing system:

by one or more hardware processor configured with computer executable instructions, executing a game session of a game application, wherein a plurality of client computing devices are connected to the game session, wherein each client computing device is associated with a user, wherein each client computing device is configured to execute a simulation engine and a presentation engine within a local execution of the game application, wherein each simulation engine is configured to execute game logic that is configured to control simulation of a virtual environment within the game application, wherein each presentation engine is configured to generate and render frames for output on a display;

receiving user input from each of the plurality of client computing devices during a simulation cycle resulting in a plurality of user inputs, wherein each of the plurality of client computing devices are synchronized to the same simulation cycle;

providing the plurality of user inputs to each of the plurality of client computing devices during the simulation cycle;

wherein, for individual client computing devices, during the simulation cycle, generating, by the simulation engine, simulation state data based at least in part on the plurality of user inputs provided during the simulation cycle;

generating, by the simulation engine, graphical state data based at least in part on the simulation state data generated for the simulation cycle;

updating, by the presentation engine, a graphical state of the virtual environment corresponding to the virtual environment associated with the individual client computing device during a rendering cycle; and rendering, by the presentation engine, a frame based at least in part on the graphical state data during the rendering cycle.

2. The computer-implemented method of claim 1, wherein the simulation cycle and the rendering cycle are different lengths of time.

3. The computer-implemented method of claim 2, wherein a plurality of rendering cycles occur for each simulation cycle, the method further comprising interpolating, by the presentation engine, the graphical state data;

generating a plurality of frames based on the interpolation; and rendering the plurality of frames.

4. The computer-implemented method of claim 1, further comprising writing the graphical state data for a least a subset of virtual objects to a state data package during the simulation cycle; and after the graphical state data for each virtual object has been written to the state data package, writing the state data package to a state stream during the simulation cycle, wherein the state stream is a portion of volatile memory allocated to receive the state data package.

5. The computer-implemented method of claim 1 further comprising waiting until each of the plurality of client computing devices has provided user input during a simulation cycle prior to providing the plurality of user inputs to each of the plurality of client computing devices.

6. The computer-implemented method of claim 1 further comprising, wherein, during each simulation cycle, the individual simulation engines wait to generate simulation state data until receiving the plurality of user inputs.

7. The computer-implemented method of claim 1, wherein length of a simulation cycle can vary based on a rate at which user input is received from the plurality of client computing devices, wherein the rate can be based at least in part on network latency associated with individual client computing devices.

8. The computer-implemented method of claim 7 further comprising removing a first client computing device from the game session if the network latency of the client computing device satisfies a network latency threshold.

9. A computing system comprising:

one or more processors configured with computer-executable instructions that configure the computing system to:

execute a game session of a game application, wherein a plurality of client computing devices are connected to the game session, wherein each client computing device is associated with a user, wherein each client computing device is configured to execute a simulation engine and a presentation engine within a local execution of the game application, wherein each simulation engine is configured to execute game logic that is configured to control simulation of a virtual environment within the game application, wherein each presentation engine is configured to generate and render frames for output on a display;

receive user input from each of the plurality of client computing devices during a simulation cycle resulting in a plurality of user inputs, wherein each of the plurality of client computing devices are synchronized to the same simulation cycle;

provide the plurality of user inputs to each of the plurality of client computing devices during the simulation cycle;

wherein for individual client computing devices during the simulation cycle, generating, by the simulation engine, simulation state data based at least in part on the plurality of user inputs provided during the simulation cycle;

generating, by the simulation engine, graphical state data based at least in part on the simulation state data generated for the simulation cycle;

updating, by the presentation engine, a graphical state of the virtual environment corresponding to the virtual environment associated with the individual client computing device during a rendering cycle; and rendering, by the presentation engine, a frame based at least in part on the graphical state data during the rendering cycle.

10. The system of claim 9, wherein the simulation cycle and the rendering cycle are different lengths of time.

11. The system of claim 10, wherein a plurality of rendering cycles occur for each simulation cycle.

12. The system of claim 9, wherein, during each simulation cycle, the individual simulation engines wait to generate simulation state data until receiving the plurality of user inputs.

13. The system of claim 9, wherein length of a simulation cycle can vary based on a rate at which user input is received from the plurality of client computing devices, wherein the rate can be based at least in part on network latency associated with individual client computing devices.

14. The system of claim 13, wherein the one or more processors are configured with computer-executable instructions to remove a first client computing device of the plurality of client computing devices from the game session if the network latency of the client computing device satisfies a network latency threshold.

15. The system of claim 9, wherein each of the plurality of client computing devices are synchronized to the same simulation cycle.

16. A non-transitory computer-readable storage medium having stored thereon instructions that, when executed, cause one or more processors to:

execute a game session of a game application, wherein a plurality of client computing devices are connected to the game session, wherein each client computing device is associated with a user, wherein each client computing device is configured to execute a simulation engine and a presentation engine within a local execution of the game application, wherein each simulation engine is configured to execute game logic that is configured to control simulation of a virtual environment within the game application, wherein each presentation engine is configured to generate and render frames for output on a display;

receive user input from each of the plurality of client computing devices during a simulation cycle resulting in a plurality of user inputs, wherein each of the plurality of client computing devices are synchronized to the same simulation cycle;

provide the plurality of user inputs to each of the plurality of client computing devices during the simulation cycle;

wherein for individual client computing devices during the simulation cycle, generating, by the simulation engine, simulation state data based at least in part on the plurality of user inputs provided during the simulation cycle;

generating, by the simulation engine, graphical state data based at least in part on the simulation state data generated for the simulation cycle;

updating, by the presentation engine, a graphical state of the virtual environment corresponding to the virtual environment associated with the individual client computing device during a rendering cycle; and rendering, by the presentation engine, a frame based at least in part on the graphical state data during the rendering cycle.

17. The non-transitory computer-readable storage medium of claim 16, wherein length of a simulation cycle can vary based on a rate at which user input is received from the plurality of client computing devices, wherein the rate can be based at least in part on network latency associated with individual client computing devices.

18. The non-transitory computer-readable storage medium of claim 17, wherein the one or more processors are configured with computer-executable instructions to remove a first client computing device of the plurality of client computing devices from the game session if the network latency of the client computing device satisfies a network latency threshold.

19. The non-transitory computer-readable storage medium of claim 16, wherein the simulation cycle and the rendering cycle are different lengths of time.

* * * * *